United States Patent
Kellermann et al.

(10) Patent No.: US 7,117,813 B2
(45) Date of Patent: Oct. 10, 2006

(54) SUBMARINE BOAT

(75) Inventors: Thammo Kellermann, Lübeck (DE); Dieter Peterich, Trappenkamp (DE); Hans Pommer, Barkelsby (DE); Gunter Sattler, Lübeck (DE)

(73) Assignee: Howaldtswerke-Deutsche Werft GmbH, (DE)

( * ) Notice: Subject to any disclaimer, the term of this patent is extended or adjusted under 35 U.S.C. 154(b) by 80 days.

(21) Appl. No.: 10/776,983

(22) Filed: Feb. 11, 2004

(65) Prior Publication Data

US 2005/0145160 A1 Jul. 7, 2005

(30) Foreign Application Priority Data

Feb. 12, 2003 (DE) ................. 103 05 778

(51) Int. Cl.
*B63G 8/00* (2006.01)
*B63B 25/08* (2006.01)

(52) U.S. Cl. ............... 114/312; 114/74 R; 114/74 A; 114/342

(58) Field of Classification Search ........ 114/317, 114/319, 324, 325, 330, 331, 333–337, 342, 114/74 R, 74 T, 74 A, 256, 257; 220/560.07, 220/560.11

See application file for complete search history.

(56) References Cited

U.S. PATENT DOCUMENTS

| | | | | |
|---|---|---|---|---|
| 2,247,595 A * | 7/1941 | Besler | ............... | 60/643 |
| 2,380,220 A * | 7/1945 | Cortese | ............... | 114/330 |
| 2,831,492 A * | 4/1958 | Bising | ............... | 137/69 |
| 2,922,544 A * | 1/1960 | Hibbard et al. | ............... | 220/89.2 |
| 3,016,866 A * | 1/1962 | Walker | ............... | 114/74 R |
| 3,112,724 A * | 12/1963 | Rosen | ............... | 114/331 |
| 3,148,508 A * | 9/1964 | Karig | ............... | 60/660 |
| 3,167,204 A * | 1/1965 | Rouse, Jr. | ............... | 220/4.12 |
| 3,171,376 A * | 3/1965 | Sellner et al. | ............... | 114/333 |
| 3,261,317 A * | 7/1966 | Gignoux | ............... | 114/33 |
| 3,376,588 A * | 4/1968 | Berteaux et al. | ............... | 441/29 |
| 3,473,337 A * | 10/1969 | Carter, Jr. | ............... | 405/185 |
| 3,665,883 A * | 5/1972 | Sege | ............... | 114/331 |
| 3,863,459 A * | 2/1975 | Rein | ............... | 62/46.3 |
| 3,973,392 A * | 8/1976 | Hallqvist | ............... | 60/39.48 |
| 4,188,157 A * | 2/1980 | Vigander | ............... | 405/210 |
| 4,228,759 A * | 10/1980 | Shinozuka | ............... | 114/342 |
| 5,123,370 A * | 6/1992 | Woidich et al. | ............... | 114/319 |
| 5,303,552 A * | 4/1994 | Webb | ............... | 60/496 |
| 2004/0096714 A1* | 5/2004 | Bette et al. | ............... | 429/25 |

FOREIGN PATENT DOCUMENTS

| | | | |
|---|---|---|---|
| DE | 2426589 A | * | 12/1975 |
| EP | 1447321 A1 | * | 8/2004 |
| FR | 1 484 918 | | 6/1966 |

(Continued)

OTHER PUBLICATIONS

Angela Psoma et al., Apr. 1, 2002, *Fuel cell systems for submarines: from the first idea to serial production*, Journal of Power Sources.
Hammerschmidt et al., 1998, *Die Brennstoffzelle und Wasserstofferzeugung mittels Reformer-Fuel Cells and Hydrogen Generation with Reformer*, Jahrbuch der Schiffbautechnischen Gesellschaft—XP-000931151.
Gunter Sattler, 2000, *Fuel cells going on-board*, Journal of Power Sources.

(Continued)

*Primary Examiner*—Ajay Vasudeva
(74) *Attorney, Agent, or Firm*—McGlew & Tuttle P.C.

(57) ABSTRACT

The submarine is equipped with a fluid gas pressure container, in particular for storing liquid oxygen. The liquid gas pressure container is arranged within the pressure hull of the submarine and is surrounded by an outer pressure container which is likewise stored within the pressure hull of the submarine. A device is provided which on exceeding a predefined pressure within one pressure container leads fluid from the pressure container out of the pressure hull.

19 Claims, 1 Drawing Sheet

FOREIGN PATENT DOCUMENTS

| | | | | |
|---|---|---|---|---|
| JP | 03157289 | A | * | 7/1991 |
| JP | 10100990 | A | * | 4/1998 |
| JP | 10181685 | A | * | 7/1998 |
| JP | 2002187595 | A | * | 7/2002 |

OTHER PUBLICATIONS

Dipl.-Ing. Hans Pommer, Aug. 1992, *Brennstoffzellen als außenluftunabhängige Antriebskomponente für Uboote*, Schiff & Hafen/SEEWIRTSCHAFT.

* cited by examiner

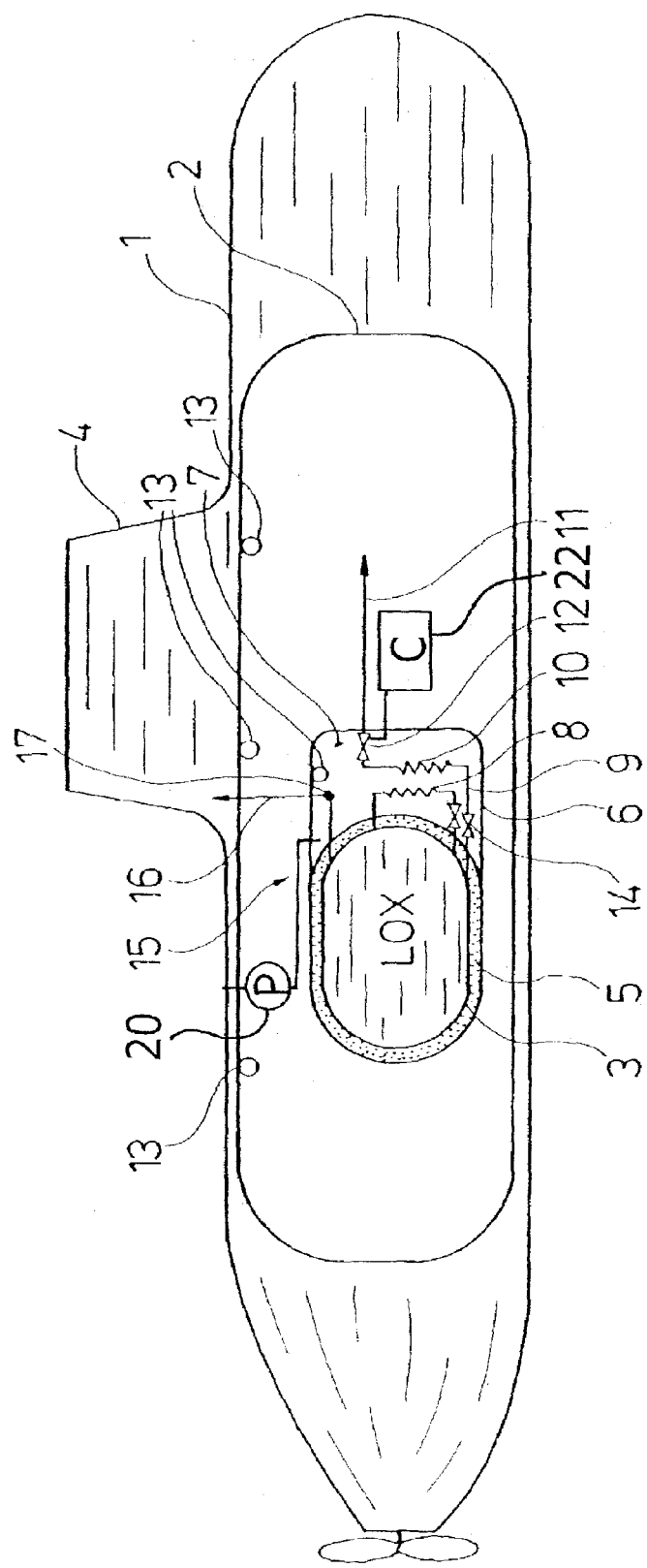

SUBMARINE BOAT

CROSS REFERENCE TO RELATED APPLICATIONS

This application claims the benefit of priority under 35 U.S.C. § 119 of German patent application DE103 05 778 filed Feb. 12, 2003, the entire contents of which are incorporated herein by reference.

FIELD OF THE INVENTION

The invention relates to a submarine with a liquid gas pressure container, in particular with a pressure container for storing liquid oxygen.

BACKGROUND OF THE INVENTION

Submarines, in particular for military application, are usually supplied underwater with electrical energy from batteries. Energy converters for producing the electrical energy from an energy source, for example hydrogen and from an oxidant, for example oxygen, are also increasingly used. Fuel cells are particularly suitable for this, in which the energy source is catalytically oxidized amid the production of electrical energy and heat. An oxygen-containing gas such as air for example, but also preferably pure oxygen which is stored cryogenically and in liquid form, are typically used as oxidants with these systems.

It is known how to store liquid oxygen (LOX) on land in order to ensure an adequate safety. The rules which apply on land however are not sufficient for the safe storage of liquid and/or gaseous oxygen in a submarine, in particular for a military application. The storage of liquid oxygen therefore has been previously effected in a liquid gas pressure container arranged outside the pressure hull, which however is rather unfavorable intrinsic of the system, since the incorporation of one or more pressure containers outside the actual pressure hull of the submarine is comparatively expensive with regard to technology, since it is not possible to provide a comparatively large container alone for fluidic reasons, as well as for reasons of weight distribution, and thus several small containers need to be attached on the outside on the pressure hull of the submarine vessel, and these need to be cased in a streamlined manner. Only in this manner may one ensure that no oxygen may reach the inside of the pressure hull of the submarine in the case of any leakage of the pressure container.

SUMMARY OF THE INVENTION

Against this background it is the object of the invention to design a submarine such that the storage and leading of liquid oxygen is simplified without endangering the safety of the vessel and those traveling on board.

According to the invention a submarine is provided comprising an outer vessel hull with a driven propeller on an outer side thereof, a pressure hull disposed in the outer vessel hull and defining a crew space for a human submarine crew. An outer pressure container is disposed in the pressure hull with the pressure hull fully surrounding the outer pressure container. The submarine is also provided with a liquid gas pressure container for storing liquid oxygen (LOX). In order at the same time to ensure the safety of the vessel and crew, the outer pressure container surrounds the liquid gas pressure container. Furthermore precautions are made which ensure that on exceeding a predefined pressure within one pressure containers, fluid is led from the pressure container out of the pressure hull of the submarine.

The inner storage of the liquid gas oxygen container offers significant advantages with regard the conceptional design of the submarine vessel, so that the vessel is smaller and less expensive than a comparable vessel with an external storage of oxygen.

The arrangement of the liquid gas pressure container within the pressure hull of the submarine has considerable advantages. The liquid gas container is also well protected due to the stable pressure hull of the submarine, in particular also with regard to the burdens which are typical in the military field. A further significant advantage is the fact that the liquid pressure container also remains accessible in the submerged condition of the vessel. The liquid gas pressure container may be designed lighter due to its protection conferred by the pressure hull. Advantages also result with regard to the insulation of the pressure container since in contrast to liquid gas pressure containers lying on the outside; the insulation is not subjected to any additional loading due to the submerged depth pressure. Finally cost advantages are also achieved since the construction of one or, as the case may be, two liquid gas pressure containers lying in the inside is considerably more economical that a multitude of pressure containers situated externally. Since for the same insulation effect the insulation layer must always be equally thick irrespective of the size, further advantages with regard to space arise, since with an increasing size of the liquid gas pressure container the resulting volume which is required for storage per liter of liquid becomes smaller. Finally, a storage of the liquid gas pressure container within the pressure hull, apart from fluidic advantages, also results in weight advantages since with liquid gas containers lying on the outside, these as a rule may only be arranged in the upper region of the submarine, which is why the container weight must also always be lifted when surfacing. This is not the case with an inner lying fluid gas pressure container with a suitable and preferred storage for example in front of the diesel motor or behind the command center or between the battery rooms.

By way of the outer pressure container provided according to the invention, as well as where appropriate, further measures with regard to safety technology which are yet to be explained in detail further below, one succeeds in achieving a safety, even with liquid gas pressure containers lying within the pressure hull, which is comparable or even exceeds that of those lying on the outside. For this, apart from the outer pressure container which in the case of a failure or part failure of the liquid gas pressure container ensures that neither liquid gas nor gas may get into the inside of the pressure hull of the submarine, the invention also envisages additional means which in the case of such an incident ensure that the liquid or gaseous oxygen located in the outer pressure container may not only be led out of the outer pressure container but furthermore out of the pressure hull so that no critical pressure may be built up here, which could damage the inside of the submarine. Any unallowably high pressure which arises may be then relieved outside the pressure hull.

According to one advantageous embodiment of the invention, the outer pressure container not only encompasses the liquid gas pressure container but furthermore also all conduits leading out of the liquid gas pressure container supplying liquid gas, and fittings including an evaporator which by way of energy supply in the form of heat energy converts the liquid oxygen coming from the liquid gas pressure container into gaseous oxygen. Thus protection is ensured by the outer pressure container for the complete region which is critical with regard to the safety, specifically wherever fluid, cryogenic oxygen must be handled. Even in the case of a rupture of a valve or the bursting of a conduit, or the exceeding of the critical temperature in the liquid gas pressure container, it is always ensured that the pressure is relieved to the outside or the oxygen for relieving the pressure is led to the outside and not into the inside of the pressure hull. A conduit is provided for this which passes through the outer pressure container as well as the pressure hull of the submarine and which is shut off by way of a safety means, and only opens in the case of a predefined excess pressure within the outer pressure container and/or liquid gas pressure container. Such a safety means may be formed for example as a pressure relief valve or a rupture disk which on exceeding a predefined pressure frees the cross section of the conduit due to permanent destruction.

In order to be able to ensure that with a build-up of an unallowably high pressure in the external pressure container, this may be relieved to the outside even in the submerged condition, it is either necessary to dimension the outer and preferably also the inner pressure container such that it withstands the submerged depth pressure, thus the pressure which acts on the submarine up to the submerged depth, or a pressure-increasing device is provided which ensures that the fluid may reliably conveyed to the outside, and specifically independently of the submerged depth, even given a small pressure within the outer pressure container. Such a pressure increasing means may for example consist of a piston cylinder arrangement with which this is achieved by way of a suitable surface ratio or also by way of suitable, safe pumps. The pressure increasing device is preferably designed such that it functions whilst making use of the pressure located in the outer pressure container. Where appropriate however, it may also function whilst making use of the pressure prevailing in the liquid gas pressure container, or in another suitable manner.

It is particularly favorable with regard to safety technology if the liquid gas pressure container is dimensioned such that its allowable operating excess pressure corresponds to the submerged depth pressure of the submarine, since then in the case of an accident, if on account of the opening of a safety means the inside of the liquid gas pressure container is connected to the surrounding medium of the submarine, there exists no danger that the liquid gas pressure container may not withstand this pressure. It is likewise useful with regard to safety technology to dimension the outer pressure container such that its allowable operating excess pressure corresponds at least to the pressure of the submerged depth of the submarine.

According to one advantageous embodiment of the invention, within the outer pressure container within the fittings space there is provided a shut-off valve, specifically for the gas conduit leading out of the outer pressure container into the pressure hull. The outer pressure container may be hermetically sealed with respect to the inside of the submarine by way of such a valve. This is not only useful with the previous mentioned case of an incident with which an increased pressure is built up within the outer pressure container, but moreover in those cases in which an increased gas concentration is detected in the inside of the submarine and thus the gas supply, in particular the oxygen supply may be centrally and reliably cut off as a precautionary manner. Preferably a further safety means is provided for this type of incident, consisting of suitable gas sensors, in particular oxygen sensors as well as suitable evaluation and control electronics which activate the shut-off valve to close in the case of a predefined gas concentration.

Gas sensors are advantageously not only provided within the pressure hull, but also (at least one gas or pressure sensor) within the outer pressure container and the armature space, in order to ascertain whether gas, in particular oxygen, exits from the liquid gas pressure container, or from a conduit leading liquid gas or gas, or from a fitting, in order in the case of such an accident to suitably activate at least the valve which shuts-off the liquid gas pressure container, as well as advantageously also to activate in a blocking manner that valve which shuts off the conduit leading from the outer pressure container into the pressure hull.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE, in a simplified representation, shows the construction of a submarine according to the invention with a liquid gas oxygen container within the pressure hull.

DETAILED DESCRIPTION OF THE INVENTION

With the submarine vessel shown in the only FIG. the outer hull of the vessel is indicated at 1, which determines the effective streamlined shape of the vessel. A cylindrical pressure hull 2 is arranged within this hull 1, as is required and is usual with submarines. A liquid gas pressure container 3 for liquid oxygen (LOX) is located within this pressure hull 1, and specifically in the region between the machine space arranged in the rear region and not shown in the figure, and the command center below the tower 4. The liquid gas pressure container 3 is provided for the storage of liquid, cryogenic oxygen. It has an essentially cylindrical, and at the ends a hemispherical shape and on its outer side is provided with an insulation 5 which in a manner known per se consists of a radiation-damping material as well as an evacuated space. This insulation 5 is attached on the inner side of the outer pressure container 6 which likewise has an essentially cylindrical shape and surrounds the liquid gas pressure container 3 including its insulation 5. The pressure container 3 as well as the pressure container 6 is designed such that their allowable operating excess pressure corresponds to the pressure of the submerged depth of the submarine.

The outer pressure container 6 significantly projects beyond the liquid gas pressure container 3 to one side, so that a fittings space 7 is formed, which encompasses all conduits, fittings and units leading liquid oxygen. A heat exchanger 8 is arranged in this armature space, via which the relief of the operating pressure for conveying the liquid oxygen from the container 3 is effected. The heat exchanger 8 is arranged in the insulation and is fed externally.

Near to the base of the container 3, a conduit 9 carrying LOX is led out of the liquid gas pressure container, and connects this to an evaporator 10. The evaporator 10 is likewise supplied externally. In the evaporator 10 liquid oxygen coming from the conduit 9 is evaporated. The gaseous oxygen from the evaporator 10 is led out of the pressure container 6 via a conduit 11. The conduit 11 may be closed by way of a controllable shut-off valve 12 using a control 22. The shut-off valve is arranged within the outer pressure container 6.

During normal operation heat is supplied to the liquid gas pressure container 3 via the heat exchanger until an operating pressure required for conveying the liquid oxygen has been built up. The liquid oxygen reaches the evaporator 10 via the conduit 9. From the evaporator 10, the oxygen in a gaseous form continues via the conduit 11 through the opened shut-off valve 12 out of the outer pressure container 6 into the inside of the pressure hull 2, and from there to a consumer, for example a fuel cell stack.

Oxygen sensors 13 are provided within the pressure hull 2 which detect the oxygen content within the pressure hull 2. These oxygen sensors 13 are connected to electronic evaluation and control means which are not shown, in a manner such that upon exceeding a predefined oxygen content within the pressure hull 2 this is detected and the shut-off valve is activated to close, in order to ensure that no further oxygen exits through the conduit 11.

The fittings space 7 is likewise equipped with a pressure sensor or also oxygen sensor 13 and evacuated, so that a leakage in a conduit or fitting located there may be detected. As soon as such a leakage has been detected, the conduit 9 on the pressure container side is shut off by way of a shut-off valve 14 in order to prevent a further entry of oxygen into the space of the outer pressure container 6. The valve 12 too is shut-off in order to seal off the outer pressure container 6 with respect to the pressure hull 2.

The liquid gas pressure container 3 as well as the outer pressure container 6 are provided with a common blow-off means 15 comprising a conduit 16 which leads out of the pressure hull 2 and which is closed off by way of a safety valve 17 or a rupture disk and opens into the surroundings. The common blow-off means 15 may include pressure threshold means with a conduit that includes a pump 20 to pump fluid out of said outer pressure container even in a submerged condition of the pressure hull. With an unallowably high increase in pressure within the liquid gas pressure container 3, in the case of such an accident a conduit connection to the outside of the pressure hull 2 is created by way of this blow-off means 15 and the pressure may be relieved to the outside via this connection. Since the pressure container 3 as well as the pressure container 6 are designed with a pressure strength such that they are capable of withstanding an inner pressure prevailing via the conduit 16 corresponding to the submerged depth of the submarine, it is ensured that the pressure within the pressure container 3 or the pressure container 6 does not rise to an unallowable extent.

A blow-off means 15 may also be provided separately for the liquid gas pressure container 3 and the outer pressure container 6. Then on exceeding a predefined pressure a direct conduit connection of the pressure container 3 to the surroundings of the submarine or of the outer pressure container 6 to the surroundings of the submarine is effected.

While a specific embodiment of the invention has been shown and described in detail to illustrate the application of the principles of the invention, it will be understood that the invention may be embodied otherwise without departing from such principles.

What is claimed is:

1. A submarine, comprising: an outer vessel hull with a driven propeller on an outer side thereof; a pressure hull disposed in said outer vessel hull and defining a crew space for a human submarine crew; an outer pressure container disposed in said pressure hull with said pressure hull fully surrounding said outer pressure container; a liquid gas pressure container storing liquid oxygen, said liquid gas pressure container being arranged within said pressure hull of the submarine and surrounded by said outer pressure container; and means provided which on exceeding a predefined pressure within one of said liquid gas pressure container and said outer pressure container lead fluid oxygen from said pressure container out of said pressure hull.

2. A submarine according to claim 1, further comprising conduits leading the fluid oxygen supplied from the liquid gas pressure container and fittings, including an evaporator, said outer pressure container encompassing all of said conduits and fittings.

3. A submarine according to claim 1, wherein said means includes a conduit provided at said outer pressure container, said conduit leading out of said pressure hull of the submarine and being blocked off by way of a safety means.

4. A submarine according to claim 3, wherein said safety means comprises a pressure relief valve.

5. A submarine according to claim 3, wherein said safety means is a rupture disk.

6. A submarine according to claim 1, wherein said means includes means which upon exceeding a predefined pressure in said liquid gas pressure container lead the fluid oxygen to the outside of the pressure hull.

7. A submarine according to claim 1, wherein said liquid gas pressure container is dimensioned such that its allowable operating excess pressure corresponds at least to the pressure at the submerged depth of the submarine.

8. A submarine, comprising: an outer vessel hull with a driven propeller on an outer side thereof; a pressure hull disposed in said outer vessel hull and defining a crew space for a human submarine crew; an outer pressure container disposed in said pressure hull; a liquid gas pressure container storing liquid oxygen, said liquid gas pressure container being arranged within said pressure hull of the submarine and surrounded by said outer pressure container; and means provided which on exceeding a predefined pressure within one of said liquid gas pressure container and said outer pressure container lead fluid from said pressure container out of said pressure hull, wherein said means includes a pressure-increasing means to ensure a leading-away of gaseous and/or liquid oxygen out of said outer pressure container even in a submerged condition of the pressure hull.

9. A submarine, comprising: an outer vessel hull with a driven propeller on an outer side thereof; a pressure hull disposed in said outer vessel hull and defining a crew space for a human submarine crew; an outer pressure container disposed in said pressure hull; a liquid gas pressure container storing liquid oxygen, said liquid gas pressure container being arranged within said pressure bull of the submarine and surrounded by said outer pressure container; means provided which on exceeding a predefined pressure within one of said liquid gas pressure container and said outer pressure container lead gaseous and/or liquid oxygen from said pressure container out of said pressure hull; and pressure increasing means that makes use of the pressure prevailing in the outer pressure container and/or in the liquid gas pressure container.

10. A submarine, comprising: an outer vessel hull with a driven propeller on an outer side thereof; a pressure hull disposed in said outer vessel hull and defining a crew space for a human submarine crew; an outer pressure container disposed in said pressure hull; a liquid gas pressure container storing liquid oxygen, said liquid gas pressure container being arranged within said pressure hull of the submarine and surrounded by said outer pressure container; and means provided which on exceeding a predefined pressure within one of said liquid gas pressure container and said outer pressure container lead gaseous and/or liquid oxygen from said pressure container out of said pressure hull, wherein said outer pressure container is dimensioned such that its allowable operating excess pressure corresponds at least to the pressure at the submerged depth of the submarine.

11. A submarine, comprising a pressure hull; an outer pressure container disposed in said pressure hull; a liquid gas pressure container storing liquid oxygen, said liquid gas pressure container being arranged within said pressure hull of the submarine and surrounded by said outer pressure container; means provided which on exceeding a predefined pressure within one of said liquid gas pressure container and said outer pressure container lead gaseous and/or liquid oxygen from said pressure container out of said pressure hull; and a shut-off valve arranged within the outer pressure container, said shut-off valve being provided for a gas conduit leading out of the outer pressure container into the pressure hull.

12. A submarine according to claim 11, wherein said shut-off valve is controlled in dependence on a gas concentration in the pressure hull.

13. A submarine according to claim 11, further comprising a control which activates the shut-off valve to close on exceeding a predefined gas concentration in the pressure hull.

14. A submarine according to claim 11, wherein at least one pressure sensor or gas sensor is arranged within the outer pressure container, and means which on detecting an increased pressure or increased gas concentration in the outer pressure container or in a fittings space of the outer pressure container, blocks off the supply of liquid gas out of the liquid gas pressure container.

15. A submarine, comprising: a pressure hull; an outer pressure container disposed in said pressure hull; a liquid gas pressure container storing liquid oxygen, said liquid gas pressure container being arranged within said pressure hull of the submarine and surrounded by said outer pressure container; means provided which on exceeding a predefined pressure within one of said liquid gas pressure container and said outer pressure container lead gaseous and/or liquid oxygen from said pressure container out of said pressure hull; and a gas sensor provided for determining the gas concentration within said pressure hull.

16. A submarine, comprising:
an outer vessel hull with a driven propeller on an outer side thereof;
a pressure hull disposed in said outer vessel hull and defining a crew space for a human submarine crew;
an outer pressure container disposed in said pressure hull;
a liquid gas pressure container arranged within said pressure hull of the submarine and surrounded by said outer pressure container;
pressure threshold means associated with one or both of said liquid gas pressure container and said outer pressure container for detecting pressure within one of said liquid gas pressure container and said outer pressure container exceeding a predefined threshold and for moving a portion of fluid gas from said pressure container out of said pressure hull, wherein said pressure threshold means includes a conduit provided at said outer pressure container, said conduit leading out of said pressure hull of the submarine and being blocked off by way of a safety means comprising a pressure relief valve or a rupture disk.

17. A submarine according to claim 16, farther comprising conduits leading fluid gas supplied from the liquid gas pressure container and fittings, including an evaporator, said outer pressure container encompassing all of said conduits and fittings.

18. A submarine according to claim 16, wherein said pressure threshold means includes a pump to pump fluid out of said outer pressure container even in a submerged condition of the pressure hull.

19. A submarine according to claim 16, farther comprising a shut-off valve arranged within the outer pressure container, said shut-off valve being provided for a gas conduit leading out of the outer pressure container into the pressure hull, wherein said shut-off valve is controlled in dependence on a gas concentration in the pressure hull.

* * * * *